United States Patent [19]

Leonard

[11] Patent Number: 5,533,151
[45] Date of Patent: Jul. 2, 1996

[54] ACTIVE CLADDING OPTICAL MODULATOR USING AN ELECTRO-OPTIC POLYMER ON AN INORGANIC WAVEGUIDE

[75] Inventor: Jerry Leonard, Plano, Tex.

[73] Assignee: Texas Instruments Incorporated, Dallas, Tex.

[21] Appl. No.: 431,191

[22] Filed: Apr. 28, 1995

[51] Int. Cl.$^6$ .................................................. G02B 6/122
[52] U.S. Cl. ............................ 385/3; 359/321; 385/130; 385/145
[58] Field of Search ..................... 385/1–5, 122, 385/129, 130, 132, 141, 142, 144, 145, 14; 359/241, 244, 321

[56] References Cited

U.S. PATENT DOCUMENTS

| | | | |
|---|---|---|---|
| 4,515,430 | 5/1985 | Johnson | 385/8 |
| 4,896,930 | 1/1990 | Tsuchitani et al. | 385/122 |
| 4,936,645 | 6/1990 | Yoon et al. | 385/2 |
| 5,006,285 | 4/1991 | Thackara et al. | 264/1.27 |
| 5,007,696 | 4/1991 | Thackara et al. | 385/2 |
| 5,103,492 | 4/1992 | Ticknor | 385/9 |
| 5,199,088 | 3/1993 | Magel | 385/18 |
| 5,265,185 | 11/1993 | Ashley | 385/132 |
| 5,291,574 | 3/1994 | Levenson et al. | 385/129 |
| 5,315,422 | 5/1994 | Utaka et al. | 385/3 X |
| 5,396,363 | 3/1995 | Valette | 385/2 X |
| 5,428,225 | 6/1995 | Silva et al. | 257/14 |

OTHER PUBLICATIONS

*1991 American Institute of Physics*, Applied Physics Letter 58(9), Ashley et al, Mar. 1991, "Channel Waveguides in Electro–Optic Polymers Using a Photopolymer Cladding Technique", pp. 884–885.
*Applied Physics Letter, vol. 63*, Hikita et al, Aug. 1993, "Optical intensity modulation in a vertically stacked coupler incorporating electro–optic polymer", pp. 1161–1163.
*1987 American Institute of Physics*, Applied Physics Letter, Ishida et al., Jan. 1987, "InGaAsP/InP optical switches using carrier induced refractive index change", pp. 141–142.

*Integrated Optical Circuits and Components*, Marcel Dekker Inc., Lynn Hutcheson, 1987, [No Month] Ti–LiNbO$_3$ Integrated Optic Technology, Korothy and Alferness, pp. 190–205.
*Technology Reports of the Osaka University*, vol. 42, No. 2091, Yutaka Sadohara et al., Apr. 1992, "WaveGuide Modulator Using Ferroelectric Liquid Crystal", pp. 137–143.
*Jap. J. Appl. Phys.*, vol. 31, Part 2, No. 8B, Wataru Sotoyama et al., Aug. 1992, "Directional–Coupled Optical Switch between Stacked Waveguide Layers Using Electro–Optic Polymer", pp. L1180–L1181.
*SPIE vol. 1559 Photopolymer Device Physics, Chemistry/Applic.*, Tumolillo, Jr., 1991, [No Month] "Fabrication Techniques of Photopolymer Clad Waveguides for Nonlinear Polymeric Modulators", pp. 65–73.
*IEEE Journal of Quantum Electronics*, vol. 27, No. 3, Robert Walker, "High Speed III–V Semi–Conductor Intensity Modulators", Mar. 1991, pp. 654–666.
*Liquid Crystal*, vol. 2, No. 4, Winter et al., Feb. 1987, "Liquid Crystal Materials' Refractive Index Matched to Silica", pp. 561–564.
*J. Appl. Physics*, vol. 75, #7, Yamauchi et al., Apr. 1994, pp. 3240.

Primary Examiner—John D. Lee
Attorney, Agent, or Firm—Bret J. Petersen; James C. Kesterson; Richard L. Donaldson

[57] ABSTRACT

Generally, the present invention is an optical waveguide circuit comprising a substrate 30, a non-organic waveguide channel 34 disposed within one or more cladding layers 32, 36 upon the substrate and an active cladding region comprising electro-optic 40, 43 or optically non-linear polymer material 46 adjacent to the waveguide channel wherein the phase of an optical signal within the waveguide channel may be modulated by controlling the index of refraction of the active cladding region. An embodiment of the present invention uses an inorganic optical waveguide 34 with a region of active organic cladding to provide a phase modulator for a Mach-Zender interferometer which can be used to implement high speed low loss switching of optical signals.

15 Claims, 1 Drawing Sheet

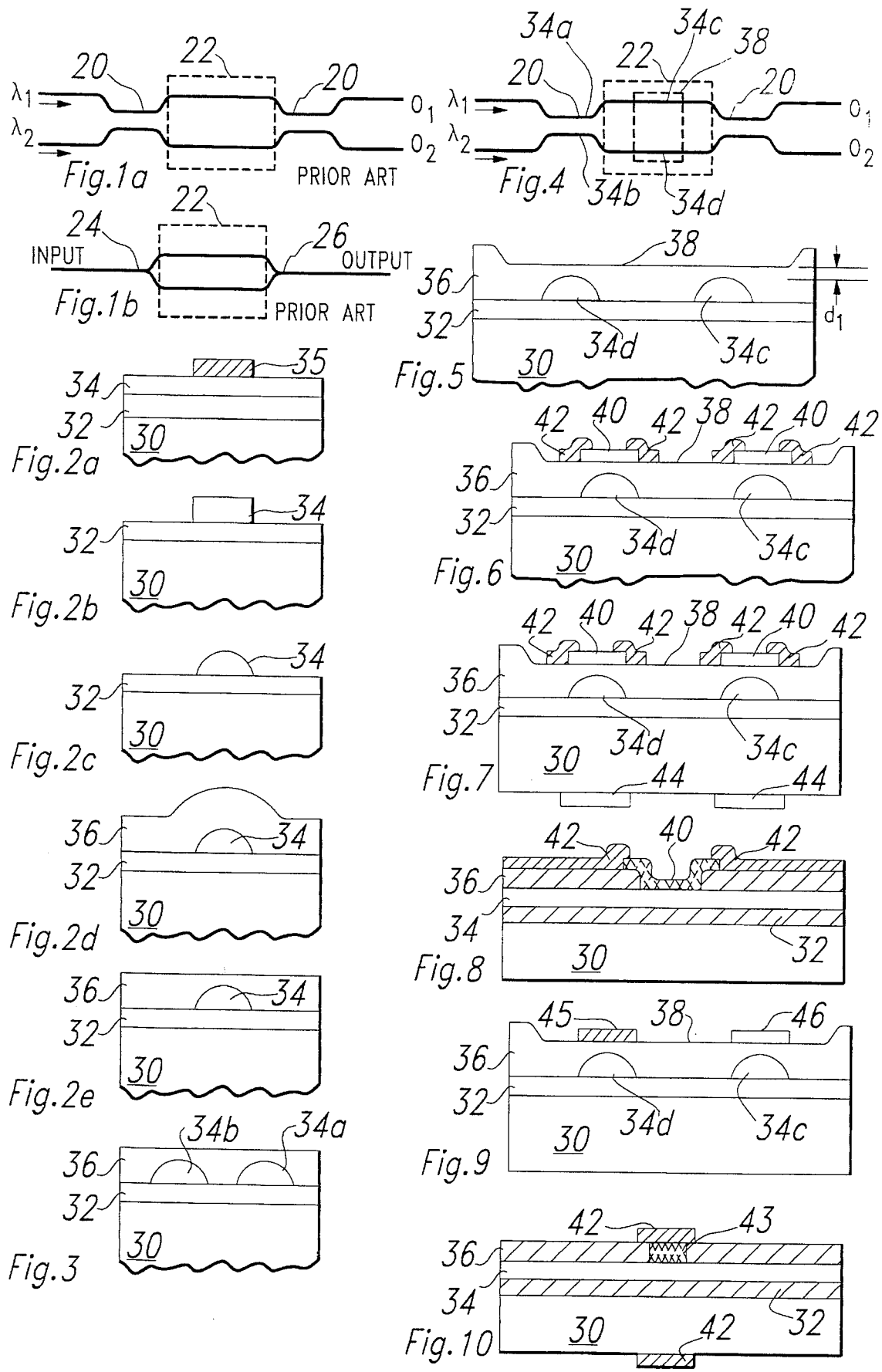

ACTIVE CLADDING OPTICAL MODULATOR USING AN ELECTRO-OPTIC POLYMER ON AN INORGANIC WAVEGUIDE

FIELD OF THE INVENTION

This invention relates to switching and modulation of optical signals propagating in a glass waveguide of an integrated circuit using electro-optic and optically non-linear polymers as active cladding layers.

CROSS-REFERENCE TO RELATED APPLICATIONS

This application is related to Co-pending application Ser. No. 08/430,998 which uses a drop-in component of non-linear optical material to achieve an optical modulator or switch.

BACKGROUND OF THE INVENTION

Optical signals used in high speed circuits and systems such as telecommunication typically are transmitted over long distance in fiber optic cables. However, on an integrated circuit these signals travel in interconnections called optical waveguides. Optical waveguides in integrated circuits are formed as cores surrounded by cladding layers on a substrate for the purpose of transmitting selected modes of optical radiation. The index of refraction of the core is, for at least one polarization in at least one direction, greater than the index of refraction for materials adjacent to the waveguide core, typically called cladding. This difference in index of refraction keeps the light traveling within the optical waveguide due to total internal reflection.

High speed communication systems require optical components that are high speed with low absorption and scattering loss of the optical signal traveling in the optical waveguide. Optical waveguides in integrated circuits fall into two general categories, those using organic and those using inorganic glass core materials and cladding. Inorganic glass waveguides such as $SiO_2$ have proven to be capable of extremely low loss, while organic waveguides offer simplified fabrication and electro-optic capability but typically without the lower loss of inorganics.

Chen et. al. discloses two polymer on glass waveguide switches in SPIE Vol. 1794, Integrated Optical Circuits II (1992), p. 388–396. The first is a X-branch channel glass waveguide with a strip of nonlinear polymer core on the center top of a "two-mode" region. The second is an asymmetric Y-branch glass waveguide with a strip of non-linear polymer on the top of one branch. These circuits confine the light energy primarily to the polymer core, in contrast to the present invention where the polymer is used as an active cladding. In addition, both are all-optical switches, that is they are activated by changes in the optical power of the signal. All-optical switches provide high speed switching but are limited to those designs where signal intensity can be modulated to control the switch. The present invention includes embodiments of all-optical switches and optoelectric switches.

SUMMARY OF THE INVENTION

While some optical circuits have combined the benefits of organic and non-organic materials, apparently this is the first use of a non-organic waveguide with an organic polymer as an active cladding to provide an electro-optic modulator or switch where the optical energy propagates in the inorganic waveguide core.

The present invention provides an optoelectronic waveguide circuit comprising a substrate, a non-organic waveguide channel deposed within one or more cladding layers upon the substrate and an active cladding region comprising an electro-optic or non-linear optic polymer material adjacent to the waveguide channel wherein the phase of an optical signal within the waveguide channel may be modulated by controlling the index of refraction of the active cladding region.

An embodiment of the present invention uses an inorganic optical waveguide with a region of active cladding to provide a phase modulator for a Mach-Zender interferometer which can be used to implement high speed, low loss switching of optical signals.

Another embodiment of the present invention uses an inorganic optical waveguide with a region of active cladding to provide a phase modulator for a Y-Branch interferometer which can be used to implement high speed low loss switching of optical signals.

In each of the two circuit embodiments above, the present invention utilizes as a modulator an interferometric region of the circuit. This region contains two waveguide cores separated to insure there is little or no coupling between the two cores. In one embodiment, a pit or recessed area is formed in the upper cladding in the interferometer region to allow a region of active cladding to be placed in close proximity to the waveguide core. After the pit is formed, an active cladding layer is applied to the surface and made to form active cladding regions over the waveguide cores in the interferometer region.

In an additional embodiment;, an organic layer may serve as both the upper cladding and electro-optic (EO) region if a suitable index is used.

In one embodiment, the active cladding region is fabricated from an EO material, which is a material that exhibits a characteristic shift in its index of refraction when exposed to an electric field. The electric field may be created by several methods including planar electrodes and vertical electrodes. When a voltage is applied to the electrodes the cladding is activated, resulting in a shift in the index of refraction and thus a corresponding shift in the phase of the light signal in that arm of the interferometer. Although only one arm of the interferometer is activated to produce the desired index shift, it may be advantageous to fabricate the identical structure on both arms of the circuit in the interferometer region to preserve the phase relationship of the signals in the two arms in the non-active mode.

In another embodiment, the active cladding region is fabricated from a non-linear optical material, which is a material that exhibits a characteristic shift in its index of refraction when exposed to light in a particular intensity. Thus this cladding region may be activated by applying a light signal with sufficient intensity to induce the needed shift in index of refraction.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 1 Shows a typical circuit structures using the phase modulator of the current invention, FIG. 1a—Mach-Zender interferometer, and FIG. 1b—Y Branch interferometer;

FIGS. 2a–2e Shows the process steps to fabricate the waveguide in a preferred embodiment;

FIG. 3 Represents a cross-sectional view of the 3 db coupling region of FIG. 1a;

FIG. 4 Illustrates a Mach-Zender Schematic showing specific elements of an embodiment;

FIG. 5 Shows a preferred embodiment showing the pit for the active cladding;

FIG. 6 Shows a preferred embodiment of the present invention with co-planer electrodes;

FIG. 7 Shows another preferred embodiment with upper and lower electrodes;

FIG. 8 Shows a side view of an alternative embodiment;

FIG. 9 Represents a cross-sectional view of an embodiment using nonlinear optical cladding; and FIG. 10 Illustrates a side view of an embodiment using a poled EO region of cladding.

DETAILED DESCRIPTION OF THE PREFERRED EMBODIMENTS

The preferred embodiments of the present invention are best understood by referring to FIGS. 1–10 of the drawings, like numerals are used for like and corresponding parts of the various drawings.

With reference to FIG. 1, there is shown two possible circuits from the prior art which can be used with a phase modulator and method of the present invention. FIG. 1a is a Mach-Zender interferometer and FIG. 1b is a Y-Branch interferometer. In the Mach-Zender circuit, incoming signals on the two inputs $\lambda_1$ and $\lambda_2$ are split by the 3 db coupler 20 into the two waveguides in the interferometric region 22. The phase modulator of the present invention is placed in one or both of the waveguides in this interferometric region. These two waveguide arms are separated to eliminate coupling between them. For an input at $\lambda_1$ and without voltage applied to the interferometer, the light arrives at the output of upper waveguide O1. However, by introducing a $\pi$ phase shift in the interferometer the light incident in input $\lambda_1$, would then exit from the lower output waveguide $O_2$. The result is a 2×2 switch for which both states can be achieved.

In the Y-Branch interferometer, FIG. 1b, the 3-dB (50/50) splitter and combiner is a symmetric Y branch. Light entering in the single-mode waveguide is equally divided into the two waveguides with zero relative phase difference at the first Y-Branch 24 junction. The two arms are then separated to eliminate coupling in the interferometric region 22. If the interferometer is not activated, the two beams arrive at the output Y-Branch in phase and are combined into the output waveguide. Other than slight losses the output is essentially the same as the input. However, if the interferometer region is activated, a $\pi$ phase difference can be introduced in one arm of the interferometer region. The light is then combined at the output Y-Branch 26 to a beam not supported by the single-mode fiber resulting in radiation out of the waveguide, effectively turning off the output. Thus, the circuit can be operated as an optical modulator or on/off switch.

With reference to FIGS. 2a–2e, there is shown a method of forming the waveguide cores for an embodiment of the present invention. FIG. 2a illustrates a silicon substrate 30 with a layer of $SiO_2$ 32 as a lower cladding. A layer of PSG 34 is then applied to the cladding to be formed into the waveguide core. Photoresist 35 is applied and patterned using conventional techniques to mask the area above the core. FIG. 2b shows the waveguide core 34 after etching and removal of the resist 35. The waveguide core 34 is then placed into a 1000° C. furnace with a steam ambient to reflow the PSG to obtain the rounded shape shown in FIG. 2c. The rounded shape reduces optical losses by smoothing the core walls and provides greater upper cladding step coverage in between cores due to reduced aspect ration of the cores.

A layer of undoped $SiO_2$ 36 Cladding is then applied over the surface of the circuit resulting in a profile shown in FIG. 2d. This upper cladding layer 36 is then planarized as shown in FIG. 2e to allow further processing on the circuit as discussed below. The planarization is preferably done by common resist etchback techniques. The cladding is applied in sufficient thickness such that after the planarization step a fairly thick cladding remains above the waveguide core, preferably about 3 to 6 um, and most preferably greater than 6 um. The thickness of the cladding is important in maintaining control of the optical energy in the core region. This thick cladding is preferably on all areas over the circuit outside the pit 38 in the interferometer region 22, discussed below.

FIG. 3 illustrates the cross-sectional view of the 3 dB coupling region 20 in the Mach-Zender circuit shown in FIG. 4. Waveguide cores 34a and 34b are preferably fabricated according to the method of FIG. 2a–2e as shown in FIG. 3. The two waveguides 34a–34b are fabricated in close proximity to produce the 3 dB coupling of light signals from one waveguide to the other.

While each of the embodiment circuits discussed above, the Mach-Zender and Y-Branch, contain an interferometer region 22 as illustrated in FIGS. 1a and 1b, for clarity, the remainder of the description will focus on the Mach Zender circuit of FIG. 4, but the discussion is applicable to the Y-Branch circuit as well. In FIG. 4, two waveguide cores 34c and 34d are shown parallel some distance apart subsequent to the 3 dB coupling region discussed above. The distance between waveguide cores 34c and 34d is chosen to insure there is no coupling between the two cores, preferably greater than 15 um. The two waveguide cores 34c and 34d pass through a pit 38 in the interferometer region 22.

FIG. 5 represents the cross section of the interferometer region 22 of FIG. 4. A pit 38 is a recessed area formed in upper cladding 36 in the interferometer region 22 to allow an active cladding to be fabricated in close proximity to the waveguide core 34 while maintaining a thick cladding region in the non-interferometric regions. The pit 38 is preferably formed by dry etching to obtain a recess in the thick upper cladding in the interferometer region 22. This recess is preferably deep enough to allow external interaction with the optical energy in the waveguide core. Distance d1 is the distance between the core and the pit surface where the drop-in component will be placed. Generally the goal is to minimize d1 to increase the effect of the active cladding while allowing for process variance such that the core is not disturbed during fabrication of the pit. Distance d1 is preferable less than 1000 A°.

The active cladding region 40 shown in FIG. 6 may be fabricated from an EO material, which is a material that exhibits a characteristic shift in its index of refraction when exposed to an electric field. The electric field may be created by several methods including planar electrodes 42 shown in FIG. 6 and vertical electrodes 44 shown in FIG. 7. Planar electrodes are fabricated by depositing and etching a conductive material such as aluminum at opposing sides of the active cladding region. When a voltage is applied to the electrodes the cladding is activated, resulting in a shift in the index of refraction and thus a corresponding shift in the phase of the light signal in that arm of the interferometer. Typically, only one arm of the interferometer is activated to produce the desired index shift. However, it is often desirable to fabricate the identical structure on both arms of the circuit in the interferometer region to preserve the phase relationship of the signals in the two arms in the non-active mode.

FIG. 8 shows a cross-sectional side view of an embodiment similar to those shown in FIGS. 6 and 7. In this embodiment an active cladding region 40 is shown adjacent to a waveguide core 34, which is a single leg of either of the circuits described above and shown as 34a or 34b in FIG. 4. In this embodiment, electrical contacts to the active cladding layer are made from the cladding level and outside the pit. Also, the active cladding is may be spaced from the waveguide cores as discussed above, or it may be in direct contact with the waveguide cores. In other words, the waveguide cores 34 may be fabricated without the reflow operation discussed above and therefore retain their rectangular shape.

FIG. 9 illustrates an embodiment where the active cladding region 40 is fabricated from a non-linear optical material. A non-linear optical material is a material which exhibits a characteristic shift in its index of refraction when exposed to light at a particular intensity. Thus this cladding region may be activated by applying a control light signal with sufficient intensity to induce the needed shift in index of refraction. This embodiment has the advantage that no electrodes and external circuitry to drive the electrodes are needed. However, this method requires the light signal to be controlled to be combined with an additional control signal. The control signal intensity is modulated to achieve the change in the index of refraction. In this embodiment the non-linear optical material would be placed on one leg of the interferometer while a passive material with the same index as the unactivated non-linear material could be placed over the other leg to preserve the non-active index of refraction.

In an additional embodiment, illustrated in FIG. 10, an organic layer with a suitable index could serve as both the upper cladding and the EO region. In this embodiment a layer of organic material 36 is fabricated over the waveguide core and then poled in one leg of the circuit to make an optically non-linear region 43. The material is poled by heating the region while in the presence of a strong electrical field. This can be done by placing a voltage e.g. 200–500 V on the electrode 42 while heating the material to about 60°–130° C. for several minutes.

The sole Table, below, provides an overview of some embodiments and the drawings.

TABLE

| Element | Specific Name | Generic Name | Alternatives |
|---|---|---|---|
| 20 | 3dB Coupler | | |
| 22 | Interferometer Region | Interferometer | |
| 24 | Input Y-Branch | | |
| 26 | Output Y-Branch | | |
| 30 | Silicon | Substrate | GaAs |
| 32 | $SiO_2$ | Cladding | Doped $SiO_2$ |
| 34 | PSG Core | Waveguide Core | Doped Si |
| 35 | Photoresist | Photoresist | |
| 36 | $SiO_2$ | Cladding | Silicon Oxides, Silicon Nitrides |
| 38 | Pit | | |
| 40 | Electro-Optic Polymer | Active Cladding | |
| 42, 44 | Aluminum | Conductive Electrodes | TiW, Ti, W |
| 43 | Poled Electro-Optic Region | Active Cladding | |
| 45 | Non-Active Polymer | Non-Active Cladding | |
| 46 | Non-Linear Optical Polymer | Active Cladding | |

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

Some examples of contemplated modifications and alternate embodiments include variations in fabrication steps. For instance, while the discussion of the preferred embodiments limited the planarization step to common etchback techniques, the present invention also contemplates using techniques such as mechanical polishing, or chemo-mechanical polishing. In addition, the pit may be formed by any standard process to obtain a recess in the thick upper cladding in the interferometer region as shown in FIG. 1. Also, the planar electrodes 42,44 may extend over or above the E-O region 43 as shown in FIG. 10.

What is claimed is:

1. An optical waveguide circuit comprising:
   (a) a substrate;
   (b) at least one inorganic waveguide core disposed within at least one cladding layer upon said substrate; and
   (c) an active cladding region comprising an organic polymer material having an index of refraction lower than that of said inorganic waveguide core fabricated adjacent to said waveguide core,
   wherein the phase of an optical signal having a mode primarily within said waveguide core may be modulated by controlling the index of refraction of said active cladding region.

2. The circuit of claim 1, further comprising:
   (d) two inorganic waveguide cores with inputs within said cladding layer and upon said substrate;
   (e) a first 3 dB coupler to provide 3 dB splitting between said waveguide cores subsequent to said inputs;
   (f) a non-coupling interferometric region subsequent to said coupler; and
   (g) a second 3 dB coupler between said two waveguide cores subsequent to said non-coupling region with outputs, wherein said active cladding region is adjacent to said waveguide cores in said non-coupling region such that the phase of at least one waveguide core optical signal can be modulated.

3. The circuit of claim 2, wherein the core material is glass.

4. The circuit of claim 2, wherein the organic polymer is an electro-optic polymer.

5. The circuit of claim 2, wherein the organic polymer is an optically non-linear polymer.

6. The circuit of claim 1, further comprising:

(d) an input on said inorganic waveguide core;

(e) a first Y-branch to provide 3 dB splitting of an optic signal on said waveguide cores subsequent to said input to two optic waveguide branches;

(f) a second Y-branch to combine said two waveguide branches; and (g) a non-coupling region between said Y-branches;

wherein said active cladding region is adjacent to said waveguide cores in said non-coupling region such that the phase of at least one waveguide core optical signal can be phase modulated.

7. The circuit of claim 6, wherein the organic polymer is an electro-optic polymer.

8. The circuit of claim 6, wherein the organic polymer is an optically non-linear polymer.

9. The circuit of claim 6, wherein the core material is glass.

10. A method of fabricating an optical waveguide circuit comprising:

(a) forming a substrate;

(b) forming at least one inorganic waveguide core disposed within at least one cladding layer upon said substrate; and (c) forming an active cladding region comprising an organic polymer material having an index of refraction lower than that of said inorganic waveguide core adjacent to said waveguide core, wherein the phase of an optical signal having a mode primarily within said waveguide core may be modulated by controlling the index of refraction of said active cladding region.

11. The method of claim 10, wherein the organic polymer is an electro-optic polymer.

12. The method of claim 10, wherein the organic polymer is an optically non-linear polymer.

13. The method of claim 10, wherein the core material is glass.

14. The method of claim 10, further comprising:

(d) forming two inorganic waveguide cores having inputs within said cladding layer and upon said substrate;

(e) forming a first 3 dB coupler to provide 3 dB splitting between said waveguide cores subsequent to said inputs;

(f) forming a non-coupling region subsequent to said coupler;

(g) forming a second 3 dB coupler between said two waveguide cores subsequent to said non-coupling region with outputs; and wherein said active cladding region is adjacent to at least one waveguide core in said non-coupling region such that the phase of at least one waveguide core optical signal can be modulated.

15. The method of claim 10, further comprising:

(d) forming an optic waveguide with an input;

(e) forming a first Y-branch to provide 3 dB splitting of an optic signal on said optic waveguide subsequent to said input to two waveguide core branches;

(f) forming a second Y-branch to combine said two waveguide branches; and (g) forming a non-coupling region between said Y-branches;

wherein said active cladding region is adjacent to said waveguide cores in said non-coupling region such that the phase of at least one waveguide core optical signal can be phase modulated.

* * * * *